Figure 1:
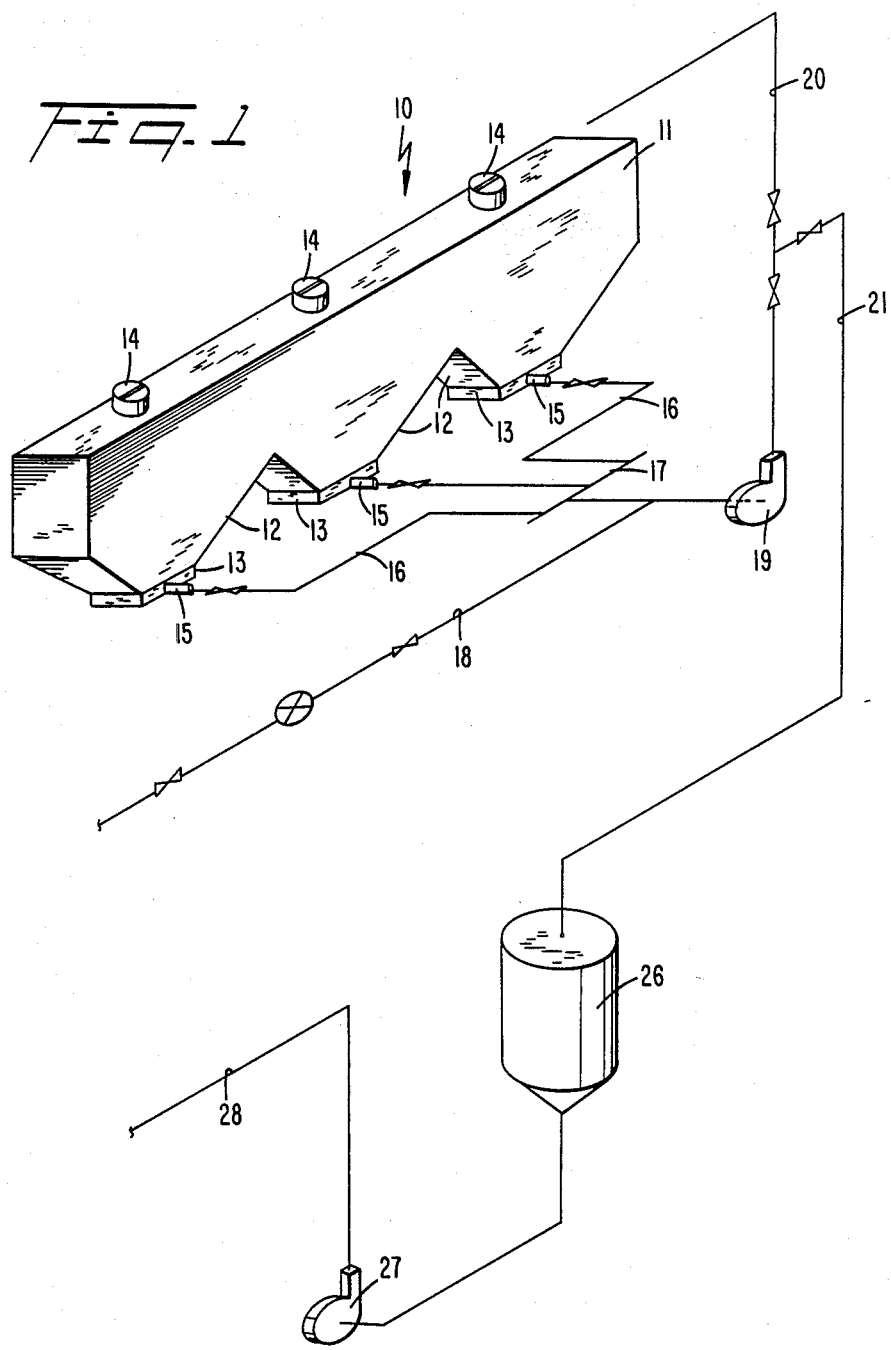

United States Patent [19]

Withiam et al.

[11] Patent Number: 4,830,546
[45] Date of Patent: May 16, 1989

[54] WEB MEMBER FOR IMPROVED IN-CAR SLURRYING

[75] Inventors: Michael C. Withiam, Elkton; Alvin E. Steelman, Havre de Grace, both of Md.

[73] Assignee: J. M. Huber Corporation, Rumson, N.J.

[21] Appl. No.: 139,754

[22] Filed: Dec. 30, 1987

[51] Int. Cl.⁴ .................. B60P 1/60; B65G 53/36; B65G 53/40

[52] U.S. Cl. .................. 406/41; 406/119; 406/134; 406/197; 406/136; 105/247

[58] Field of Search .................. 406/38, 39, 41, 46, 406/47, 48, 134, 121, 197, 198, 145, 108, 122, 117–120, 127, 136–139; 105/247, 279, 423; 222/630

[56] References Cited

U.S. PATENT DOCUMENTS

| | | | |
|---|---|---|---|
| 3,359,041 | 12/1967 | Corbett-Smith et al. | 406/39 X |
| 3,512,842 | 9/1970 | Milewski et al. | |
| 3,690,730 | 9/1972 | Sakata et al. | 406/137 X |
| 3,729,232 | 4/1973 | Sakata et al. | 406/137 X |
| 3,929,261 | 12/1975 | Solimar | 222/195 |
| 4,036,663 | 7/1977 | Williams et al. | 106/308 B |
| 4,189,262 | 2/1980 | Anderson | 406/136 |

FOREIGN PATENT DOCUMENTS

| | | | |
|---|---|---|---|
| 91285 | 8/1978 | Japan | 406/137 |
| 91287 | 8/1978 | Japan | 406/137 |
| 91289 | 8/1978 | Japan | 406/137 |

*Primary Examiner*—Joseph F. Peters, Jr.
*Assistant Examiner*—James M. Kannofsky
*Attorney, Agent, or Firm*—Harold H. Flanders; Alec H. Horn; Robert L. Price

[57] ABSTRACT

An improved method for slurrying bulk dry powder material within a hopper car is described. The method includes providing a static web of individual strands extending through the interior of the hopper compartment so that when water is admitted to the bottom of the hopper car, the water will travel upwardly along the strands of the web and through the dry bulk material to wet the same.

5 Claims, 2 Drawing Sheets

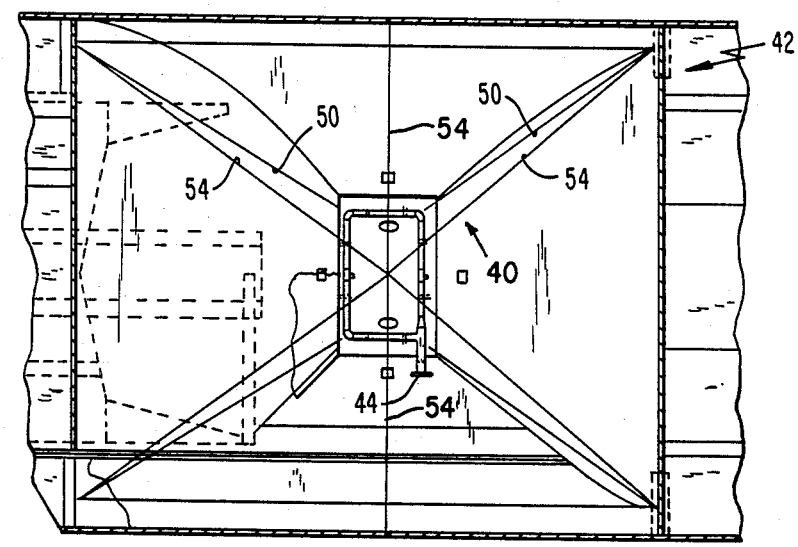
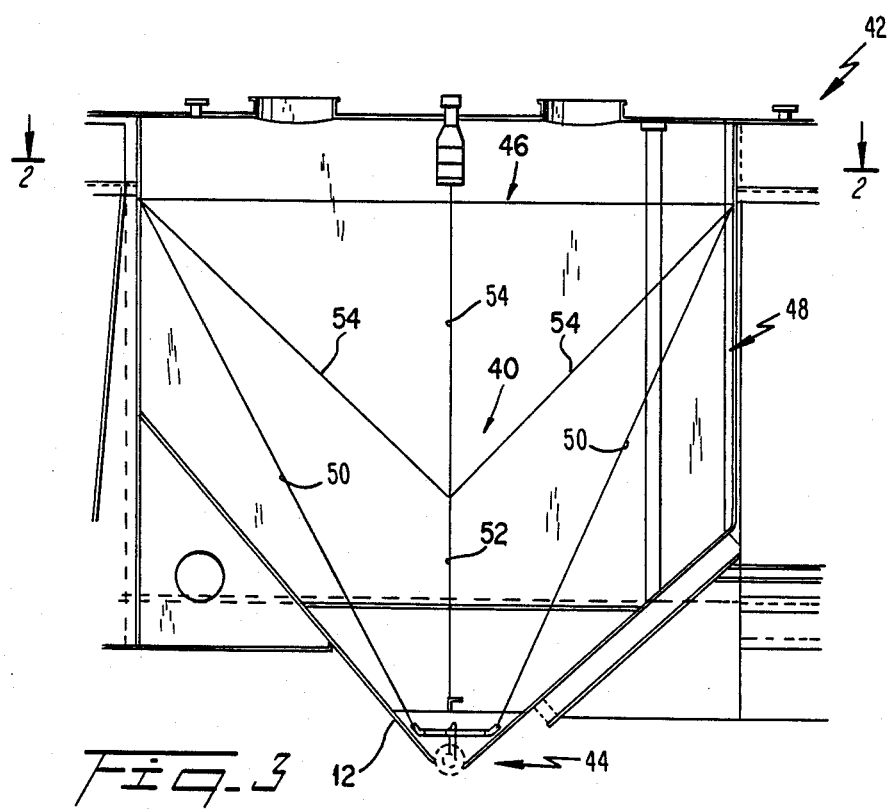

WEB MEMBER FOR IMPROVED IN-CAR SLURRYING

FIELD OF THE INVENTION

This invention is directed to the movement of bulk pulverulent materials having a mean diameter in the submicron range and in particular to the slurry unloading of dry bulk powder from railroad hopper cars or the like.

BACKGROUND OF THE INVENTION

The shipment of dry bulk powder materials in, for example, railroad hopper cars results in settling or compacting of the materials. When dry bulk materials such as pigments arrive at a users plant various methods have been proposed for moving the pigment from the railroad hopper car to storage facility for subsequent use.

In U.S. Pat. No. 3,512,842 owned by the assignee of this invention, it was proposed to introduce warm water into the dry bulk powder to form a slurry. The particles would then wet out after a soaking period of several hours. Air was subsequently injected into the slurry to facilitate the formation of a homogeneous slurry which would be suitable for pumping. Air was introduced through pipes mounted along the sides and bottom of the hopper with multiple holes, mutually spaced, for expelling air under pressure. Typically the pipes were one half inch in diameter with 3/16 inch holes spaced about one foot apart and air pressure of 80 to 100 pounds per square inch (gauge) was used.

Water at a temperature of between 73° F. and 100° F. was introduced at the bottom of the hopper at a low controlled rate to make up a slurry containing about 2.3 to 2.4 pounds of sodium alumino silicate per gallon.

The patent further states that after air agitation, the slurry is recycled by pumping the slurry from the bottom of the hopper car and returning it to the top to further assist in forming a homogeneous slurry. The slurry then can be pumped to a storage tank for use later in the plant.

This procedure requires high capacity pumps. While at rest, the slurry material often became a jelly-like material requiring further agitation to become fluid. In addition, a concentration in excess of about 2.4 pounds per gallon has such a high viscosity that pumping was difficult.

Subsequently, in U.S. Pat. No. 4,036,663, also assigned to the assignee of this invention, an alternate procedure was proposed wherein a finely divided deliquescent salt was admixed with the dry powder before water was admitted. The salt was typically blended in a weight range of about 0.1% to 3% by weight of the pigment mixture before slurrying. While this procedure was effective, it increased the cost of the pigment and required a facility for the dry mixing step.

A further effort to improve the off loading of dry powder is described in U.S. Pat. No. 4,189,262. In that patent a plurality of aeration devices are mounted in the bottom of the hopper. The aeration devices were as disclosed in U.S. Pat. No. 3,929,261 and included a head with a movable flap which fluttered as air passed through the head and into the surrounding powder material of the hopper compartment.

SUMMARY OF THE INVENTION

It has been discovered that a static web of wires or cables disposed within the hopper compartment will have a dual effect on dried bulk powder materials when they are slurried. The web will keep the materials from packing as densely as they would normally during shipment and when water is admitted at the bottom of the hopper the web members will provide pathways through the bulk material for the water so that it will more uniformly circulate through the materials. Furthermore, during slurrying the web materials will tend to break up clumps of unwetted material, especially if air agitation is used, to aid mixing.

Accordingly, it is an object of this invention to provide a construction for railroad hopper cars and the like to facilitate the forming of a water slurry of bulk powder materials shipped therein.

It is another object to provide a web of wires or cables extending through the hopper compartment to reduce the tendency of dried powder materials therein to pack and to provide a pathway through the dense powder material for water admitted to the bottom of the hopper.

These and other objects will become readily apparent with reference to the drawings and following description wherein:

BRIEF DESCRIPTION OF THE DRAWINGS

FIG. 1 is a schematic view of a hopper car with associated piping for unloading a slurry.

FIG. 2 is a cross sectional view taken along lines 2—2 of FIG. 3 of a hopper compartment having the web of this invention mounted therein; and FIG. 3 is a side view of a hopper car compartment with the side wall removed to show the web of this invention.

DETAILED DESCRIPTION OF THE INVENTION

FIG. 1 is a schematic showing the system generally used to slurry unload dry bulk powder shipments. That system is similar to that disclosed in U.S. Pat. No. 3,512,842 and accordingly the disclosure of that patent is hereby incorporated by reference. The instant invention is intended to be either a modification of or an addition to this system as will be subsequently explained.

Referring to FIG. 1, a typical railroad hopper car 10 is intended to be modified according to the following description.

The hopper car 10 generally has a body 11 and a plurality of hoppers 12 depending therefrom. The hoppers 12 have generally rectangular boxes 13, and the car is provided with filling domes 14 to give access to the interior 11 of the car for filling with a dry powder material.

A pipe coupling 15 is provided in box 13, and coupling 15 is intended to be attached to water line 16 during the slurry process. As will be obvious to those skilled in the art appropriate valves are provided in line 16. Conduits 16 extend from a manifold 17 which in turn is fed by a water line 18. A pump 19 is connected to manifold 17 and is adapted to pump slurry through a recycle line 20 or a product line 21 which extends to a storage tank 26. Storage tank 26 is connected to pump 27 for pumping the slurry through line 28 to its point of use in the plant.

The water supply line 18, as will be obvious to those skilled in the art can be provided with a water meter and a temperature gauge when warm water is to be used.

Typically a pneumatic agitator system is provided within each hopper 12 fed by conduits (not shown) which connect the pneumatic aeration system as will be subsequently described, with a remote source of compressed air (not shown). The pneumatic system described, in the above identified patent included a plurality of pipes disposed along the sides and bottom of the hopper with a plurality of air outlets therein. That system can be used with that of the instant invention if desired.

When water was admitted to the hoppers 12 through couplings 15 even with air agitation through conduits as mentioned above, as the water rose it tended to meander through the powder material leaving pockets or clumps of dry materials which even in an overnight soak, would not wet out. Recycling was somewhat effective in breaking up these "clumps".

With attention to FIGS. 2 and 3, the web device 40 of this invention 40 is intended to be mounted within the compartment 42 in hopper car 10. FIGS. 2 and 3 are a schematic representation of a hopper car compartment with the bottom outlet, water inlet, and optional air agitation means removed for the purpose of clarity.

Web 40 is intended to extend from the upper portion of compartment 42 to the bottom thereof and diagonally from the upper portion to a central location as will be described. The purpose as noted above, is to pass through the dense bulk material to minimize packing and also to provide a pathway for water when the water is admitted at the base 44 of hopper 12. The web 40 may be mounted within compartment 42 in any conventional fashion such as by providing a frame 46 around the upper portion 48 of compartment 42. The individual strand members may be cables, wires or the like.

In the preferred embodiment of this invention, corner strands 50 extend from the upper portion 48 where they are attached from the frame 46 to the floor defined by base 44 where they may be attached by any conventional means. Then, a central strand 52 is mounted in the center of base 44 and extends upwardly to terminate at between about ⅓ to ½ the distance from base 44 to the frame 46 as shown in FIG. 3. Strand 52 is then supported by diagonal strands 54 which extend from each of the four corners and preferably from a midpoint on each of the long sides of compartment 42.

The wires or cable may be slack to allow about 3 inches deflection over 10 feet to further assist in agitating the dry material as water and/or air is admitted to the hopper.

In a preferred embodiment, strand 52 is about three feet long and a total of six diagonal strands 54 are provided extending respectively from the corners and the midpoint of each long side of the hopper to the upper end of strand 52.

In summary, it has been discovered that by providing a web of wires or cables within a hopper car, the slurrying of dry powder contents is facilitated. The strands passing through the contents of the hopper compartment make the contents less dense or packed after shipment. In addition, as water and/or air agitation is admitted through the bottom of the hopper car, the individual strands of the web provide a pathway for the water and if air agitation is used, the web members help to break up clumps of unwetted powder so that the slurry can be formed more rapidly and efficiently and the contents of the hopper car can be pumped to a storage location.

The invention may be embodied in other specific forms without departing from the spirit or essential characteristics thereto. The present embodiments are therefore to be considered in all respect as illustrative and not restrictive, the scope of the invention being indicated by the appended claims rather than by the foregoing description, and all changes which come within the meaning and range of equivalency of the claims are therefore intended to be embraced therein.

We claim:

1. A method for improved in-car slurrying of dry bulk powder material with water in a hopper car for off-loading said powder in slurry form, comprising the steps of:
   providing a hopper car with a plurality of hopper compartments, each compartment having means at a bottom thereof for admitting water to an interior thereof; and
   providing a web of individual strands within each compartment adapted to extend through the compartment interior and through the dry material, said strands extending from an upper portion of the compartment to a lower portion of the compartment and diagonally from the upper portion to a middle portion of the compartment and from a center of the bottom to the middle portion.

2. The method of claim 1 wherein the compartment is rectangular in cross section and strands extend from upper corners of the compartment to the bottom.

3. The method of claim 2 wherein the strand extending from the center of the bottom to the middle portion is about three feet long.

4. The method of claim 1 wherein said web consists of eleven individual strands.

5. The method of claim 1 wherein said individual strands permit a deflection of about three inches in ten feet.

* * * * *